Feb. 11, 1969

J. ZACKEY 3,427,583

SAFETY SIGNAL FOR VEHICLES

Filed Nov. 1, 1967

INVENTOR.
JAMES ZACKEY
BY Robert K. Youtie
ATTORNEY.

United States Patent Office 3,427,583
Patented Feb. 11, 1969

3,427,583
SAFETY SIGNAL FOR VEHICLES
James Zackey, 216 Charles Ave.,
Runnemede, N.J. 08078
Filed Nov. 1, 1967, Ser. No. 679,887
U.S. Cl. 340—66                                6 Claims
Int. Cl. B60q 1/44, 1/50

ABSTRACT OF THE DISCLOSURE

This invention is concerned essentially with a heel switch in the floor of a vehicle connected in a stoplight circuit to close the circuit and energize the stoplight when the driver's heel is removed from the floor, but without energizing the stoplight upon mere raising of the foot from the accelerator pedal.

Background of the invention

As is well known to those versed in the art, a considerable number of vehicle signal systems have been proposed wherein a rear light is energized prior to actual braking action, usually upon release of the accelerator pedal. However, in present-day congested traffic conditions, and especially as many drivers habitually depress and release the accelerator pedal, an excessive number of signals are given. At the least, this impedes the rapid and orderly flow of traffic, and is very likely to cause rear-end chain collisions resulting from release of an accelerator without application of the brake.

On the other hand, stoplight signals energized only upon actual application of the brake are often too late to give the necessary warning especially to a rapidly moving and closely following vehicle.

It therefore remains desirable to provide a signal to the next-rearward driver indicating actual braking action with sufficient warning time to prevent collison, but without excessive signaling or premature signaling.

Summary

Accordingly, it is an important object of the present invention to provide a signal system for automotive vehicles wherein a rear-end signal is afforded in advance of actual application of the brake, but only upon great likelihood of braking action, which signal is sufficiently ahead of the braking action to afford adequate warning time, but without being excessively premature or of a false and undue frequency.

It is another object of the present invention to provide an automotive-vehicle signaling system having the advantageous characteristics mentioned in the preceding paragraphs which is extremely simple in construction, entirely reliable throughout a long useful life, and which can be economically incorporated in new vehicles or attached to existing vehicles at a minimum of cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Description of the preferred embodiments

Figure 1:
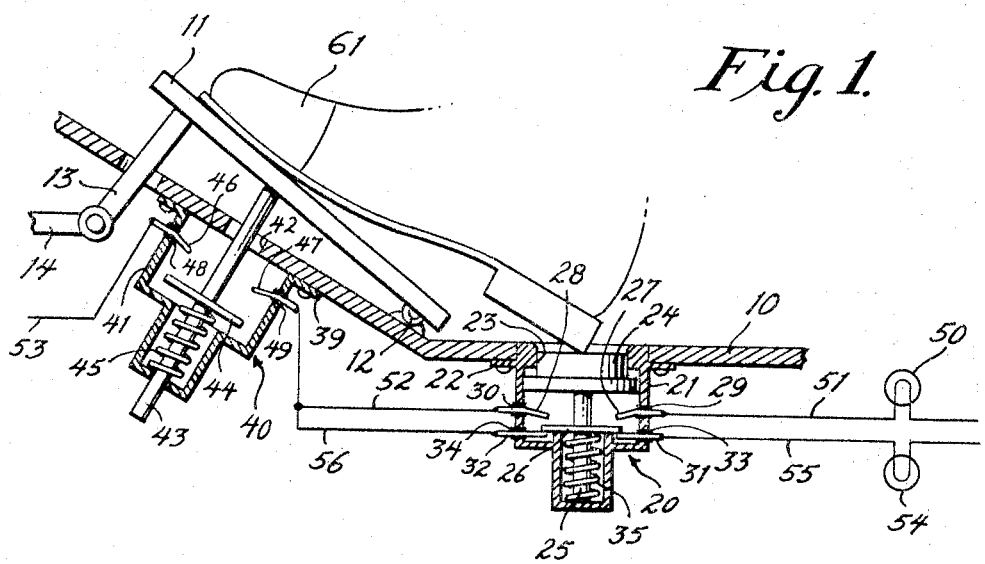
FIGURE 1 is a longitudinal sectional elevational view showing the floor, accelerator pedal and associated parts of the instant invention in a normal operating condition of use.
Figure 2:
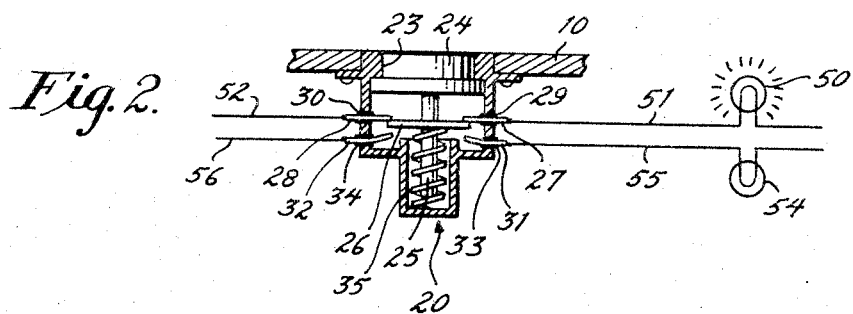
FIGURE 2 is a partial sectional elevational view similar to FIGURE 1, but showing another operating condition.

Referring now more particularly to the drawing, and specifically to FIGURES 1 and 2 thereof, an automobile floor is designated 10, and an accelerator pedal 11 is shown conventionally mounted on the floor, as by a pivotal support 12 at its rear end. Connected to the forward end of the accelerator pedal 11 may be an arm 13 suitably connected, as by a link 14 to the throttle linkage. As thus far described, the structure may be conventional.

Mounted in the floor 10 may be a switch, generally designated 20. The switch 20 may include an upwardly opening generally cylindrical housing 21 mounted in the floor 10, as by a peripheral flange 22 fastened to the underside of the floor. The open upper end of the cylindrical housing 21 may have an internal lip or flange 23 defining an upper limit or stop. Interiorly of the housing 21 may be mounted a vertically shiftable actuating member or plunger 24 including a shank 25 depending from the plunger. A switch member or plate 26 is carried by the shank 25 for vertical reciprocation with the plunger 24.

Carried by the housing 21, say at diametrically opposed regions thereof, is an upper pair of contacts 27 and 28, which are located in a plane above and over the switch plate member 26, and mounted in the housing 21 insulated therefrom, as by insulators 29 and 30. Upon upward movement of the plunger 24, together with its shank 25 and plate 26, the latter engages with and bridges the contacts 27 and 28 to close a circuit therebetween.

A lower pair of spaced contacts 31 and 32 may be mounted in diametrically opposed relation in the cylindrical wall of housing 21, as by respective insulators 33 and 34 at a level below the switch member or plate 26. Upon depression of the plunger 24, together with its shank 25 and switch plate 26, as shown in FIGURE 1, the switch plate engages and bridges the contacts 31 and 32 to close a circuit between the contacts. In addition, resilient means such as a coil compression spring 35 may be circumposed about the shank 25 in resilient bearing engagement with the underside of switch plate 26 to urge the latter upward to a limiting position with the plunger 24 abutting the stop 23. This condition is shown in FIGURE 2, where it will be seen that the plate member 26 engages and closes a circuit between the upper contacts 27 and 28.

Thus, the switch means 20 may be considered as a pair of heel switches, one having contacts 27 and 28, and the other having contacts 31 and 32; or, the overall assembly may be considered as a single double-pole double-throw switch.

In addition, a switch generally designated 40 is mounted in the floor 10 in operative relation with respect to the pedal 11. The switch 40 includes a generally cylindrical housing 41 having an open upper end provided with a circumferential flange 39 suitably secured to the underside of the floor beneath the accelerator pedal. Through the floor 10 beneath the pedal 11 may be formed a hole 42, and an elongate rod or shaft 43 may be connected to the pedal and extend through the hole 42 and axially through the switch housing 41. A switch member or plate 44 may be circumposed about and carried by the rod 43, and a coil compression spring 45 may be circumposed about the rod beneath the plate 44 to urge the plate and rod upwardly.

Carried by the switch housing 41, say at diametrically opposed regions thereof, may be a pair of resilient contacts 46 and 47, preferably insulated from the switch housing, as by insulator mountings 48 and 49. The switch 40 is normally closed, as by extension of the spring 45 to raise the plate 44 into engagement with the contacts 46 and 47 to close a circuit therebetween.

Carried by a vehicle, say at the rear end thereof, may be a stoplight 50. The stoplight 50 is connected in a suitable power circuit, as by a conductor 51 extending from one side of the stoplight to contact 27. A conductor 52 extends from contact 28 to contact 47, while an additional conductor 53 extends from contact 46 to one side of an ignition switch.

An additional signal means, such as a caution light 54, may be carried by the vehicle, say at the rear end thereof, having one side electrically connected by a conductor 55 to contact 31. A conductor 56 may be connected between contact 32 and conductor 52.

Figure 3:
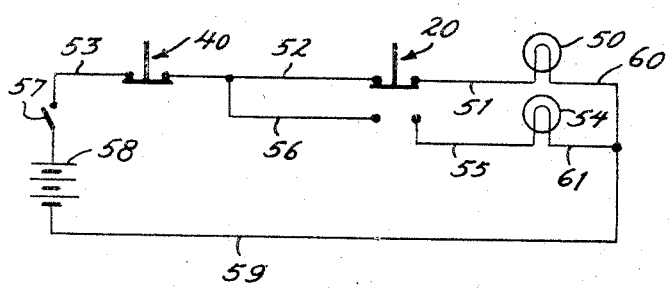
FIGURE 3 is a schematic representation of the circuitry of the instant invention.

This circuitry is best seen in FIGURE 3. It will there appear that the conductor 53 is connected to an ignition switch 57, which may be connected to a suitable power supply, such as a battery 58, the latter being in turn connected, say through a conductor 59, to conductors 60 and 61, which are respectively connected to signal means or lamps 50 and 54.

In operation, as seen in FIGURE 1, it will be apparent that the switch 40 is depressed to an open condition, being a two-point make switch and the plate 44 being depressed away from engagement with the contacts 46 and 47. In this condition, even with the ignition switch 57 closed, there is no complete circuit through either or both of the lamps 50 and 54. As this is normal driving, no signal is being given.

Upon deceleration, as by pivoting the foot 61, see FIGURE 1, of the user upward about the heel to release the accelerator pedal 11, it will be understood that a circuit is closed through accelerator-pedal switch 40 and contacts 31 and 32 of switch 20 to energize the caution light 54. This signal may be yellow to indicate deceleration and caution.

It is only upon complete removal of the foot 61 from the floor 10 and accelerator pedal 11 that both the switch 40 is closed as well as the switch 20 between the contacts 27 and 28. This serves to energize the stoplight 50 and affords an early and relatively positive warning that the brake will be applied. Of course, the plate 26 has moved upward in this condition to open the contacts 31 and 32 and deenergize the caution light 54. This is the condition shown in FIGURE 3.

While the preferred embodiment, as illustrated and described, may include both the caution light 54 and stoplight 50, it is appreciated that the instant device may also achieve certain important objects without utilizing the caution light 54. By such arrangement the pedal switch 40 may be eliminated, as well as the lower contacts 31 and 32 of switch 20.

From the foregoing, it is seen that the present invention provides an automotive vehicle signal system which fully accomplishes its intended objects and is well adapted to meet practical conditions of manufacture, installation and use.

Although the present invention has been described in some detail by way of illustration and example for purposes of clarity of understanding, it is understood that certain changes and modifications may be made within the spirit of the invention and scope of the appended claims.

What is claimed is:

1. In an automotive vehicle including a floor, and an accelerator pedal on the floor for depression by a user's foot with his heel on the floor, the combination comprising: a stoplight carried by the vehicle, an electric circuit for connecting said stoplight to a power supply, and a normally closed heel-operable switch mounted in said floor for depression by a user's heel during normal depression of the accelerator pedal and electrically connected in said circuit for closure upon removal of the user's foot from the floor, whereby said stoplight is energized upon removal of the foot from the floor prior to depression of the brake pedal but is not energized upon mere raising of the foot on the accelerator pedal to decelerate with the heel remaining on the floor.

2. The combination according to claim 1, said heel-operable switch being resiliently biased upwardly to its closed position.

3. The combination according to claim 1, in combination with a caution light, an electric circuit for connecting said caution light to a power supply, a second normally open heel-operable switch mounted in said floor for depression by a user's heel during normal depression of the accelerator pedal and electrically connected in said caution-light circuit for closure upon depression, and a normally closed pedal-operable switch associated with said pedal to be opened by depression thereof and electrically connected to said caution-light circuit for closure upon raising of the user's foot on the pedal to decelerate, whereby the caution light is energized upon deceleration with the user's foot remaining on the floor.

4. The combination according to claim 3, said first-mentioned and second heel switches comprising a single double-pole double-throw switch.

5. The combination according to claim 4, in combination with resilient means biasing said single heel switch to close said stoplight circuit.

6. The combination according to claim 3, said pedal switch comprising a two-point make switch.

References Cited

UNITED STATES PATENTS

| | | | |
|---|---|---|---|
| 1,269,954 | 6/1918 | Nigh | 200—61.89 |
| 2,832,863 | 4/1958 | Quimby | 340—71 |

ALVIN H. WARING, *Primary Examiner.*

U.S. Cl. X.R.

340—71; 200—61.89